United States Patent [19]
Brandener

[11] Patent Number: 5,836,624
[45] Date of Patent: Nov. 17, 1998

[54] METAL PART INCLUDING A SPHERICAL WALL ELEMENT, AND AN EXHAUST BALL-COUPLING INCLUDING SUCH A PART

[75] Inventor: Louis Brandener, Poissy, France

[73] Assignee: Financiere de Segur, Paris, France

[21] Appl. No.: 564,224

[22] PCT Filed: Jun. 23, 1994

[86] PCT No.: PCT/FR94/00760

§ 371 Date: Dec. 20, 1995

§ 102(e) Date: Dec. 20, 1995

[87] PCT Pub. No.: WO95/00792

PCT Pub. Date: Jan. 5, 1995

[30] Foreign Application Priority Data

Jun. 25, 1993 [FR] France .................................. 93 07758

[51] Int. Cl.[6] .................................................. F16L 27/04
[52] U.S. Cl. .......................... 285/261; 285/266; 285/916; 72/105; 72/367
[58] Field of Search .................................... 285/267, 268, 285/266, 916, 261, 262, 263, 264, 265, 269, 270, 271; 72/105, 362, 367

[56] References Cited

U.S. PATENT DOCUMENTS

| | | | |
|---|---|---|---|
| 2,641,488 | 6/1953 | Dunn et al. | 285/916 |
| 3,449,937 | 6/1969 | Dimmig | 72/367 X |
| 4,419,829 | 12/1983 | Miller | 33/178 R |
| 4,871,181 | 10/1989 | Usher et al. | 285/267 X |
| 5,040,805 | 8/1991 | Ozora . | |
| 5,203,593 | 4/1993 | Brandener | 285/267 X |

FOREIGN PATENT DOCUMENTS

| | | |
|---|---|---|
| 0115016 | 8/1984 | European Pat. Off. . |
| 2019323 | 3/1970 | France . |
| 2596492 | 2/1987 | France . |

Primary Examiner—Dave W. Arola
Attorney, Agent, or Firm—Griffin, Butler, Whisenhunt & Kurtossy

[57] ABSTRACT

The spherical wall element (2, 15) is provided with a series of work-hardened annular strips (16, 17) spaced apart and extending substantially coaxially so as to form reinforcement that is not very deformable for the spherical wall element.

4 Claims, 1 Drawing Sheet

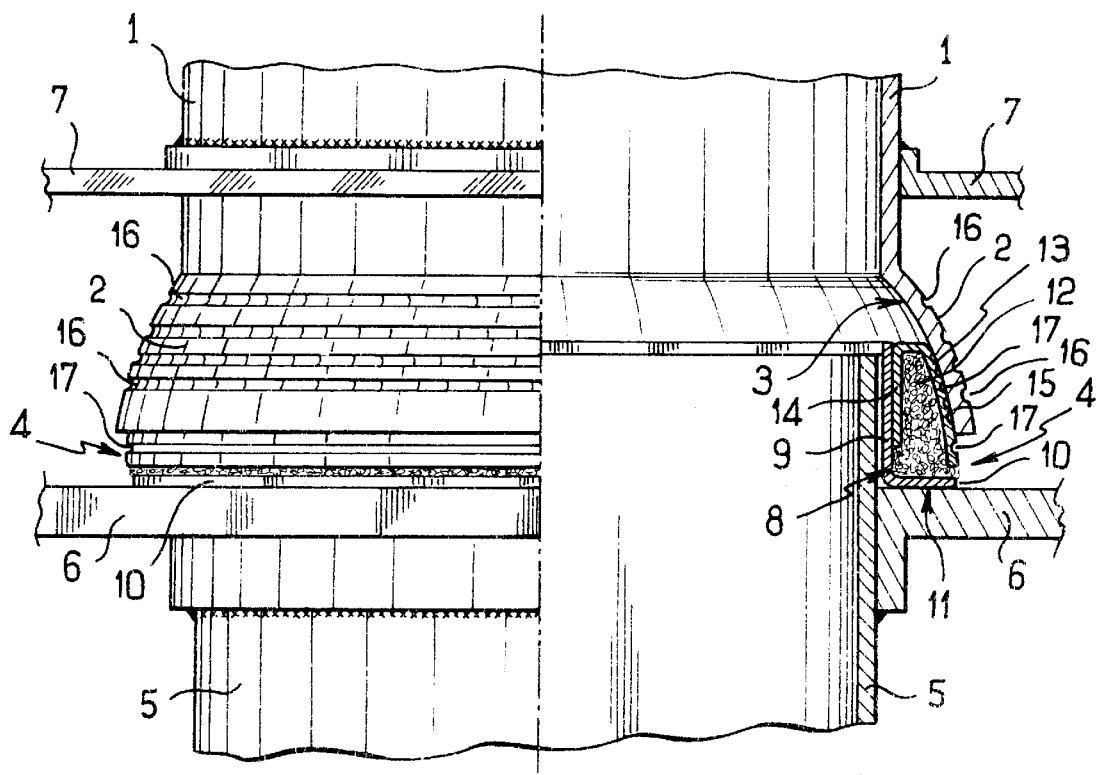
FIG_1
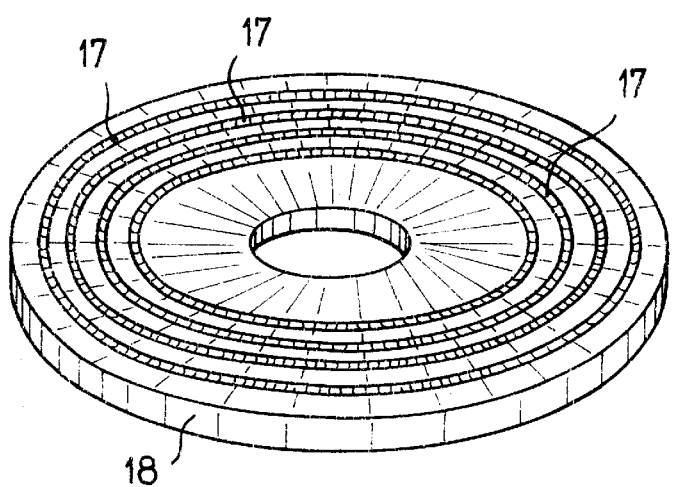
FIG_3
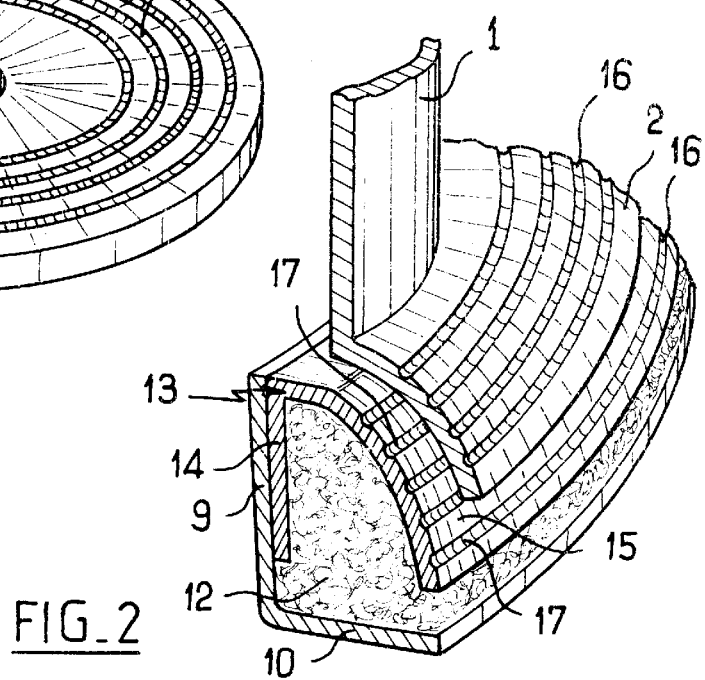
FIG_2

5,836,624

METAL PART INCLUDING A SPHERICAL WALL ELEMENT, AND AN EXHAUST BALL-COUPLING INCLUDING SUCH A PART

The present invention relates to a metal part including a spherical wall element, a method of making the part, and an exhaust ball-coupling including such a part.

BACKGROUND OF THE INVENTION

It is known that, in order to avoid transmitting vibration from an engine to an exhaust pipe or tube, in particular from a transversal engine, it is necessary to dispose a flexible coupling between the exhaust manifold which is fixed to the engine and the exhaust pipe which is fixed to the chassis of the vehicle. Flexible couplings referred to as "ball-couplings" are known in which a length of tube is flared at one end so as to form a concave spherical abutment portion which co-operates with a convex spherical abutment portion carried by a facing length of tube, the spherical abutment portions being held in contact with each other by resilient link members exerting sufficient pressure on the spherical abutment portions to keep the coupling gastight while enabling one length of tube to move relative to the other. In general, the convex spherical abutment portion is constituted by the outside surface of an annular gasket mounted on one of the lengths of tube and abutting against a flange fixed thereto.

The concave spherical abutment is commonly made by stamping the end of the tube, so that it is impossible to guarantee either that the concave inside surface is accurately spherical or that said inside surface has a radius that is exactly identical to the radius of the outside surface of the exhaust gasket, especially after prolonged use of the coupling at the high temperatures to which the coupling is subjected when the exhaust gases pass through the flexible coupling.

As a result of these imperfections, the concave spherical surface and the convex spherical surface do not rub against each other over their entire facing portions, but rather over zones which are distributed discontinuously and between which the gases can leak, so that the gastightness of the coupling is not guaranteed.

SUMMARY OF THE INVENTION

The invention provides a metal part that can be used as a constituent part of an exhaust ball-coupling, which part includes a spherical wall element provided with a series of work-hardened annular strips spaced apart and extending substantially coaxially.

In this way, the work-hardened annular strips, which are more resistant to deformation than the non work-hardened portions of the metal part, constitute very accurate reinforcement for said part, thereby considerably improving the gastightness of the coupling when the spherical wall is associated with a corresponding spherical surface.

In a preferred application of the invention, an exhaust ball-coupling is made comprising firstly a first length of metal tube having an end provided with a spherical wall element that has a concave spherical inside surface, and secondly a second length of tube carrying an annular exhaust gasket provided with a spherical wall element having a convex spherical outside surface in contact with the concave inside surface of the first length of tube, the spherical wall elements of the first length of tube and of the exhaust gasket being provided with work-hardened annular strips having surfaces that are set back from respective non-facing sides of the wall elements. Thus, the gastightness of the coupling is very good because its constituent parts are shaped accurately, while the friction forces between the coupled spherical surfaces are minimized.

BRIEF DESCRIPTION OF THE DRAWINGS

Other characteristics and advantages of the invention will appear on reading the following description of a particular embodiment of the invention given by way of non-limiting example and with reference to the accompanying drawing, in which:

FIG. 1 is an elevation view of a ball-coupling of the invention including spherical wall elements, half of the figure being in section on a plane containing the longitudinal axis of the coupling;

FIG. 2 is an enlarged fragmentary perspective view of the coupling shown in FIG. 1; and FIG. 3 is a perspective view of a blank for a metal part of the invention.

DESCRIPTION OF PREFERRED EMBODIMENTS

The metal part of the invention is particularly well suited to being used in a ball-coupling as shown in FIGS. 1 and 2. The ball-coupling includes a first length of tube 1 having an end provided with a spherical wall element 2 having a concave spherical inside surface 3 which extends over an exhaust gasket given the overall reference 4. The gasket 4 is engaged around the cylindrical end of a second length of tube 5 and it abuts against a flange 6 fixed to the second length of tube, e.g. by being welded, which flange is set back slightly from the end of the length of tube 5. A flange 7 is also fixed to the first length of tube 1. The flanges 6 and 7 are interconnected by link members 18A urging them towards each other.

The spherical wall element 2 of the tube 1 is provided with work-hardened annular strips 16 which are spaced apart and which extend substantially coaxially about the longitudinal axis of the first length of tube 1.

In the preferred embodiment shown, the spherical wall element 2 is obtained in a manner known per se by stamping a cylindrical tubular metal blank which is gradually flared into a spherical shape by a series of stamping passes. According to the invention, the work-hardened annular strips 16 are preferably formed on the metal blank by locally applying a force that is sufficient to work-harden the metal blank along spaced-apart circular strips. For example, the work-hardening may performed by applying a wheel against the outside surface of the cylindrical metal blank. In which case, the surface against which the wheel is applied is marked by the wheel, so that the surface of each of the work-hardened strips is set back from the outside surface of the spherical wall element 2 after it has been shaped.

The annular exhaust gasket includes a tubular support given the overall reference 8 and comprising a cylindrical sleeve 9 engaged around the end of the length of tube 5, and a base 10 which extends perpendicularly to the cylindrical sleeve 9, and is provided with a plane bottom surface 11 that rests on the facing face of the flange 6.

An annular resilient pad 12, e.g. a resilient pad made of knitted and compressed steel wire, is mounted on the cylindrical sleeve 9 and is covered by an annular trough-shaped washer given the overall reference 13 and comprising firstly a tubular central portion 14 mounted to slide in gastight manner on the cylindrical sleeve 9 of the tubular support, and secondly a spherical peripheral wall element 15 fixed to the central portion 14 and having a convex spherical outside surface covering the annular resilient pad 12.

In order to facilitate installing and replacing the annular gasket 4 despite the manufacturing tolerances of the second length of tube 5, or deformations thereof after it has been in use for a certain amount of time, the inside diameter of the cylindrical sleeve 9 of the tubular support 8 is preferably slightly larger than the outside diameter of the length of tube 5, so that the sleeve can be engaged freely thereon.

The spherical wall element 15 of the trough-shaped washer 13 of the exhaust gasket 4 is provided with work-hardened annular strips 17 that are spaced apart and that extend substantially coaxially about the longitudinal axis of the cylindrical sleeve 9. Like the spherical wall element 2 of the first length of tube 1, the trough-shaped washer 13 of the exhaust gasket 4 is preferably made by stamping a metal blank. In which case, the metal blank may, for example, be a plane annular plate 18 as shown in FIG. 3. Prior to stamping, the work-hardened annular strips 17 are formed, e.g. by punching the annular plate 18 with a punch provided with concentric circular ribs. By way of example, the trough-shaped washer 13 may be made from an annular steel plate having a thickness of eight-tenths of a millimeter, and, to make a trough-shaped washer having a diameter of about 100 mm and a height of about 12 mm, six work-hardened annular strips are advantageously formed, each of which has a width of 0.5 mm, the strips being spaced apart from one another by a radial distance of 1.5 mm, and the height of the ribs on the punch being three-tenths of a millimeter.

In the example shown, the blank 18 is deformed by stamping so that the surface that has been punched faces outwards from the trough-shaped washer 13, so that the work-hardened annular strips 17 have surfaces that are set back from the spherical outside surface of the exhaust gasket 4.

Once the flexible coupling is assembled, the leak-proofing between the first length of tube 1 and the annular exhaust gasket 4 is provided by the contact between the concave inside surface of the first length of tube and the convex outside surface of the spherical wall portion 15 of the trough-shaped washer 13. The work-hardened annular strips 16 and 17 serve as reinforcement for the corresponding spherical wall elements, and they guarantee very good accuracy when shaping the facing spherical surfaces so that excellent gastightness is obtained. Furthermore, since the set-back surfaces of the work-hardened annular strips 17 are disposed on the outside of the trough-shaped washer 13, friction between the spherical wall element 2 and the exhaust gasket 4 is minimized.

Furthermore, leak-proofing between the exhaust gasket 4 and the second length of tube 5 is provided by contact between the plane inside surface 11 of the base 10 and the top surface of the flange 6.

By way of example, the tubular support of the exhaust gasket was formed by stamping a tube having a thickness of 1 mm and an inside diameter of 64 mm, the cylindrical sleeve having a height of 14 mm. The trough-shaped washer was formed by stamping an annular steel sheet having a thickness of 0.8 mm so as to obtain a cylindrical central portion having a height of about 10 mm and a peripheral portion having a height of about 12 mm. An annular preform made of knitted steel wire was disposed around the cylindrical sleeve which was disposed in a die and covered by the trough-shaped washer. The resulting assembly was then compressed axially until it had a height substantially equal to the height of the cylindrical sleeve. On being compressed, the central portion 14 of the trough-shaped washer 13 was crimped slightly on the cylindrical sleeve 9 of the tubular support by the reaction of the mass of knitted steel wire, so that the trough-shaped washer 12 slides in gastight manner on the cylindrical sleeve, thereby making it possible both to take advantage of the resilient characteristics of the annular pad 12 while providing leak-proofing between the trough-shaped washer 13 and the tubular support 8.

Naturally, the invention is not limited to the embodiment described, and variants may be made thereto without going beyond the ambit of the invention as defined by the claims.

In particular, although the spherical wall element 2 of the first length of tube 1 is described as being made from a cylindrical tubular blank, it may be made like the trough-shaped washer 13, i.e. from an annular plane plate on which the work-hardened annular strips 16 are formed concentrically, the plate then being deformed appropriately and the resulting part then being fixed to the end of the length of tube 1.

Although the work-hardened annular strips are described as having surfaces set back from the outsides of the wall elements 2 and 15, it is possible to form work-hardened annular strips having surfaces set back from the inside of the wall element 2. In which case the outside surface of the wall element 15 is preferably smooth, e.g. by forming the work-hardened strips 17 with their surfaces set back from the inside of the inner wall portion 15. The work-hardened annular strips 16 may also be formed with their surfaces set back from the outside of the wall element 2 while the work-hardened annular strips 17 are formed with their surfaces set back from the inside of the wall element 15.

Although, in the embodiments described, the annular strips are work-hardened by applying a force to one side only of the metal blank, a symmetrical force may be applied to both sides of the metal blank so as to minimize deformation of the metal while it is being work-hardened.

What is claimed is:

1. An exhaust ball-coupling comprising a first length of metal tube having an end provided with a spherical wall element that has a concave spherical inside surface, and a second length of tube carrying an annular exhaust gasket having a convex spherical outside surface in contact with the concave inside surface of the first length of tube, said first and second lengths of tube being provided with flanges interconnected by link members urging said flanges towards each other, wherein the spherical wall element of the first length of tube is provided with a series of work-hardened annular strips spaced apart and extending substantially coaxially.

2. An exhaust ball-coupling according to claim 1, wherein the exhaust casket includes a spherical metal wall element having a series of work-hardened annular strips spaced apart and extending substantially coaxially, and the work-hardened annular strips of the wall element of the first length of tube and of the gasket have surfaces that are set back from respective non-facing sides of the wall element.

3. An exhaust ball-coupling comprising a first length of metal tube having a flared end that has a concave spherical inside surface, and a second length of tube carrying an annular exhaust gasket provided with a spherical metal wall element having a convex spherical outside surface in contact with the concave inside surface of the first length of tube, said first and second lengths of tube being provided with flanges interconnected by link members urging said flanges towards each other, wherein the spherical metal wall element of the exhaust gasket is provided with a series of work-hardened annular strips spaced apart and extending substantially coaxially.

4. An exhaust ball-coupling according to claim 3, wherein the work-hardened annular strips have surfaces that are set back from the outside surface of the exhaust gasket.

* * * * *